(12) United States Patent
Nakashima et al.

(10) Patent No.: US 11,489,979 B2
(45) Date of Patent: Nov. 1, 2022

(54) READING APPARATUS WITH A FIRST MEDIUM TRANSPORT PATH COUPLED TO A SECOND MEDIUM TRANSPORT PATH AND A THIRD MEDIUM TRANSPORT PATH, WHERE THE THIRD MEDIUM TRANSPORT PATH INCLINED AT AN ANGLE SMALLER THAN THE ANGLE FORMED BY THE SECOND MEDIUM TRANSPORT PATH INCLINED WITH THE FIRST TRANSPORT MEDIUM PATH

(71) Applicant: SEIKO EPSON CORPORATION, Tokyo (JP)

(72) Inventors: Hiroki Nakashima, Fukuoka (JP); Tsuyoshi Yamanaka, Matsumoto (JP); Tokujiro Okuno, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/209,383

(22) Filed: Mar. 23, 2021

(65) Prior Publication Data
US 2021/0306492 A1    Sep. 30, 2021

(30) Foreign Application Priority Data
Mar. 25, 2020    (JP) .............................. JP2020-053840

(51) Int. Cl.
*H04N 1/00*    (2006.01)
*H04N 1/203*    (2006.01)

(52) U.S. Cl.
CPC ..... *H04N 1/00612* (2013.01); *H04N 1/00681* (2013.01); *H04N 1/00795* (2013.01)

(58) Field of Classification Search
CPC ........... H04N 1/00612; H04N 1/00681; H04N 1/00765; H04N 1/0057; H04N 1/00594; H04N 1/122; H04N 1/00655; H04N 1/00702; H04N 1/00732; H04N 1/00745; H04N 1/00782; H04N 1/00806; H04N 1/12; H04N 1/193; H04N 1/2032; H04N 2201/0081; B65H 1/06; B65H 2402/441;
(Continued)

(56) References Cited

U.S. PATENT DOCUMENTS 5,463,451 A * 10/1995 Acquaviva ............. G03G 15/23
355/24
5,680,204 A * 10/1997 Ferrara ................ H04N 1/1017
355/75

(Continued)

FOREIGN PATENT DOCUMENTS

JP    2019-163131    9/2019
WO   2012-137469    10/2012

*Primary Examiner* — Chad Dickerson
(74) *Attorney, Agent, or Firm* — Workman Nydegger

(57) ABSTRACT

A reading apparatus includes: a reading section that reads a side of a medium; a first medium transport path that includes a position facing the reading section; a second medium transport path coupled to a medium mounting section and coupled to the first medium transport path, the second medium transport path being inclined at a first angle with respect to the first medium transport path; and a third medium transport path coupled to the first medium transport path, the third medium transport path being inclined at a second angle, which is less than the first angle, with respect to the first medium transport path.

12 Claims, 4 Drawing Sheets

(58) Field of Classification Search
CPC ............ B65H 2402/46; B65H 2403/42; B65H 2403/92; B65H 2404/611; B65H 2405/324; B65H 2407/21; B65H 2511/415; B65H 2513/42; B65H 2701/1914; B65H 2801/39; B65H 5/062; B65H 5/26
USPC .............. 358/1.11–1.18, 496, 498, 495, 486; 399/364
See application file for complete search history.

(56) References Cited

U.S. PATENT DOCUMENTS

| | | | |
|---|---|---|---|
| 2007/0194520 A1* | 8/2007 | Kusama | ................. B65H 29/20 271/225 |
| 2008/0259414 A1* | 10/2008 | Kitagawa | ........... H04N 1/00567 358/498 |
| 2010/0309528 A1* | 12/2010 | Nacman | ................... H04N 1/40 358/444 |
| 2012/0105925 A1 | 5/2012 | Shirai et al. | |
| 2014/0063574 A1 | 3/2014 | Uchida | |
| 2019/0297208 A1* | 9/2019 | Kawata | .............. H04N 1/00602 |

* cited by examiner

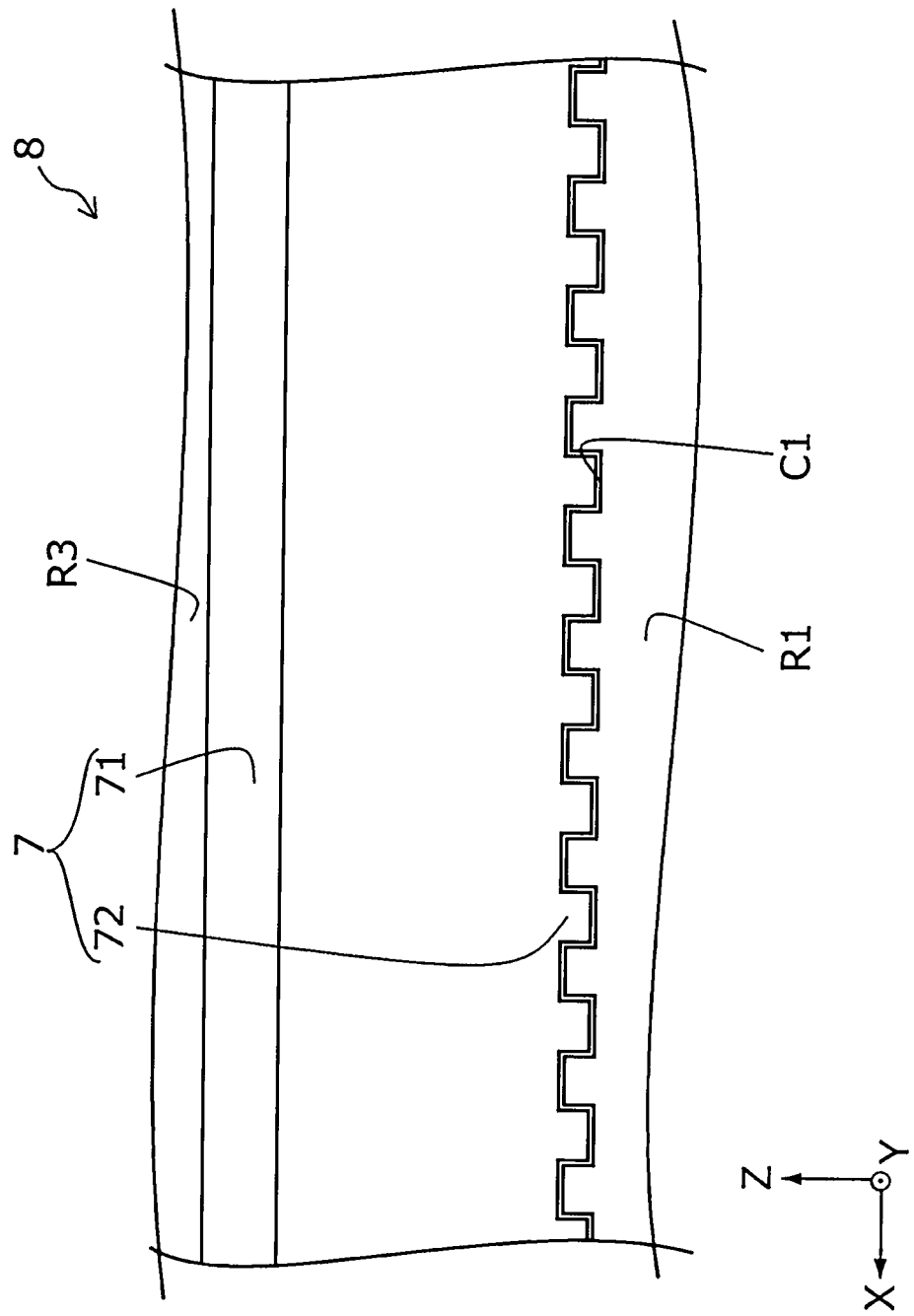

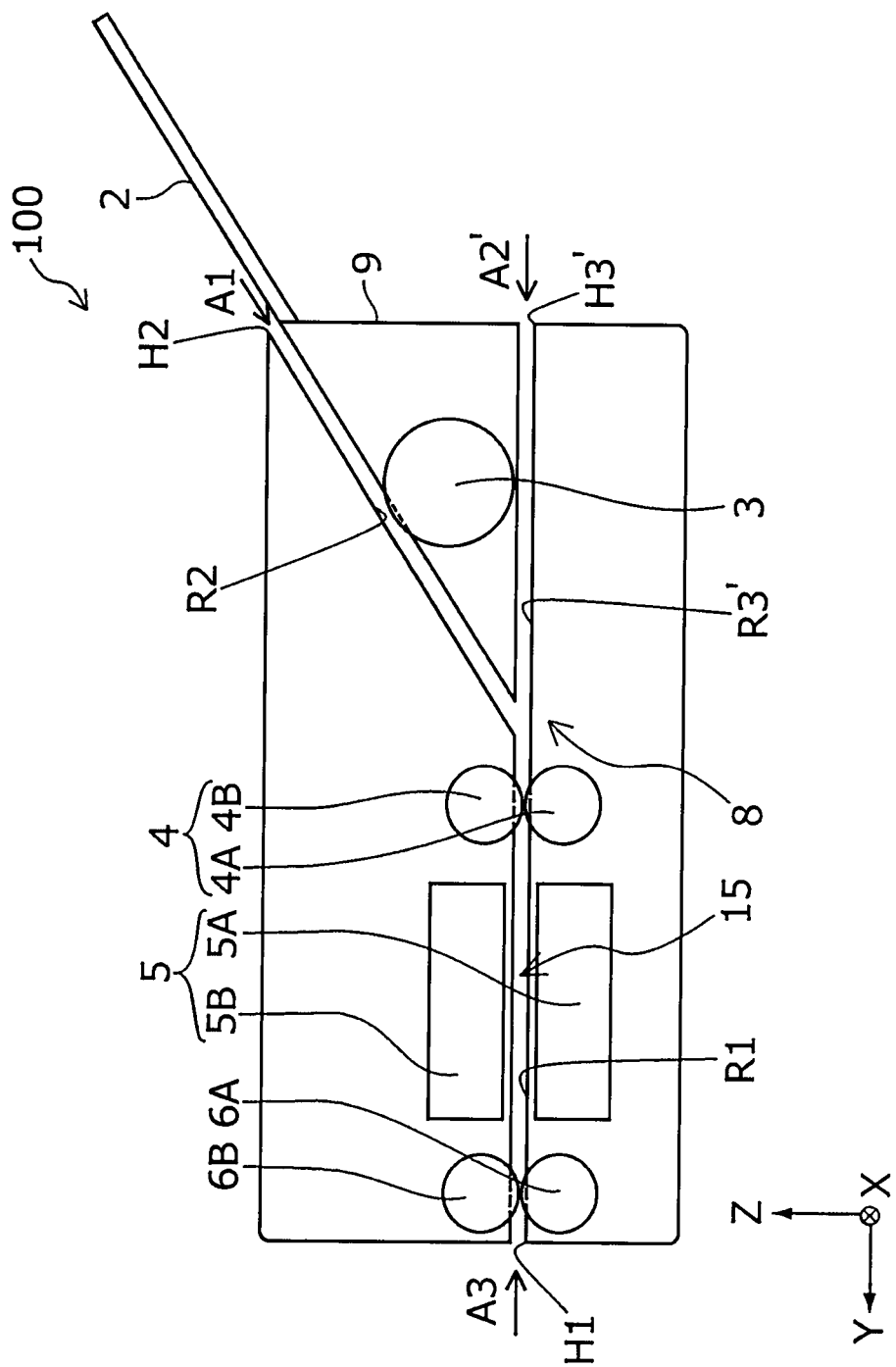

READING APPARATUS WITH A FIRST MEDIUM TRANSPORT PATH COUPLED TO A SECOND MEDIUM TRANSPORT PATH AND A THIRD MEDIUM TRANSPORT PATH, WHERE THE THIRD MEDIUM TRANSPORT PATH INCLINED AT AN ANGLE SMALLER THAN THE ANGLE FORMED BY THE SECOND MEDIUM TRANSPORT PATH INCLINED WITH THE FIRST TRANSPORT MEDIUM PATH

The present application is based on, and claims priority from JP Application Serial Number 2020-053840, filed Mar. 25, 2020, the disclosure of which is hereby incorporated by reference herein in its entirety.

BACKGROUND

1. Technical Field

The present disclosure relates to a reading apparatus.

2. Related Art

A reading apparatus that transports a medium and reads a side of the transported medium has been used. For example, WO2012/137469 discloses a scanner apparatus capable of reading a plurality of types of media and feeding the media in two different directions. Further, JP-A-2019-163131 discloses an image reading apparatus that includes a medium separating-transport path, a medium reading-transport path, and a medium drawing-transport path as a plurality of medium transport paths and that is capable of switching to a medium transport path to be used by using a transport path-switching flap.

In some cases, a reading apparatus may read a booklet type medium, such as a passport or a bankbook, in addition to a sheet type medium. In the scanner apparatus disclosed in WO2012/137469 or the image reading apparatus disclosed in JP-A-2019-163131, a medium may be fed by mounting the medium diagonally downward on the back side of the apparatus. However, with a configuration in which such an inclined transport path is included, since an inclination of a coupling portion between a horizontal transport path that faces a medium reading section and the inclined transport path is excessively steep, it is difficult to appropriately transport a booklet type medium. Therefore, for example, with a configuration in which a medium is inserted from a horizontal transport path that faces a medium reading section as in the scanner apparatus disclosed in WO2012/137469 and the medium is transported through a medium transport path that is coupled straight from the horizontal transport path as in the image reading apparatus disclosed in JP-A-2019-163131, it is possible to appropriately transport a booklet type medium. However, with such a configuration, a large space for allowing insertion or discharge of the medium needs to be provided on the back side of the apparatus. Further, when an inclined transport path is further provided to appropriately transport a sheet type medium, the inclined transport path needs to be provided so as to avoid a medium transport path that is coupled straight from the horizontal transport path. Therefore, the size in a height direction becomes large.

SUMMARY

According to an aspect of the present disclosure, a reading apparatus includes: a reading section that reads a side of a medium; a first medium transport path that includes a position facing the reading section; a second medium transport path coupled to a medium mounting section and coupled to the first medium transport path, the second medium transport path being inclined at a first angle with respect to the first medium transport path; and a third medium transport path coupled to the first medium transport path, the third medium transport path being inclined at a second angle, which is less than the first angle, with respect to the first medium transport path.

BRIEF DESCRIPTION OF THE DRAWINGS

FIG. 3 is a schematic front view illustrating a portion in the vicinity of the flap of the reading apparatus according to the embodiment of the present disclosure.

FIG. 4 is a schematic side sectional view of a reading apparatus according to a reference example.

DESCRIPTION OF EXEMPLARY EMBODIMENTS

Figure 1:
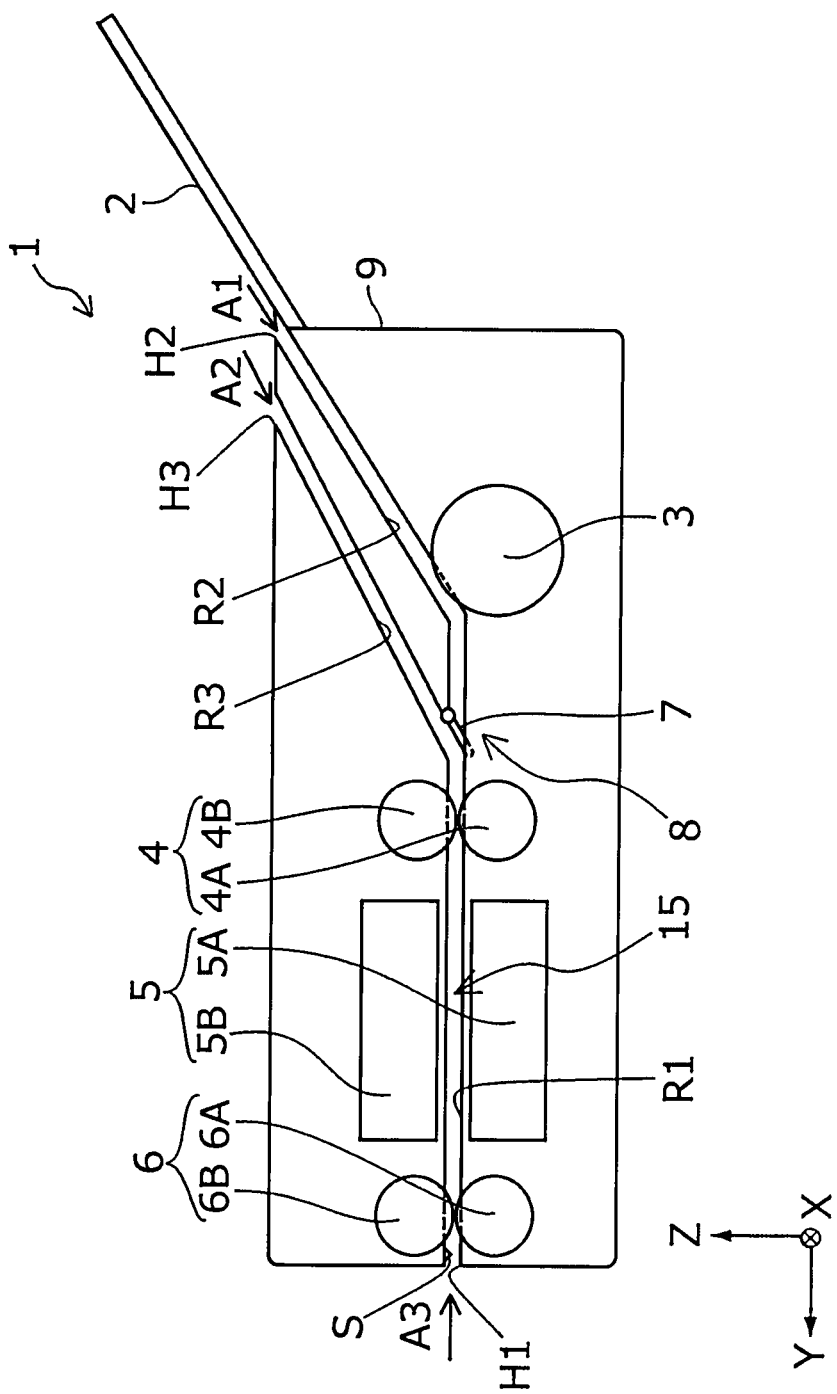
FIG. 1 is a schematic side sectional view of a reading apparatus according to an embodiment of the present disclosure.

First, the present disclosure will be schematically described.

A reading apparatus of a first aspect of the present disclosure includes: a reading section that reads a side of a medium; a first medium transport path that includes a position facing the reading section; a second medium transport path coupled to a medium mounting section and coupled to the first medium transport path, the second medium transport path being inclined at a first angle with respect to the first medium transport path; and a third medium transport path coupled to the first medium transport path, the third medium transport path being inclined at a second angle, which is less than the first angle, with respect to the first medium transport path.

According to the present aspect, the reading apparatus includes the first medium transport path that includes the position facing the reading section, the second medium transport path that is coupled to the medium mounting section and coupled to the first medium transport path while being inclined at the first angle with respect to the first medium transport path, and the third medium transport path that is coupled to the first medium transport path while being inclined at the second angle less than the first angle with respect to the first medium transport path in the direction in which the second medium transport path is inclined with respect to the first medium transport path. Therefore, it is possible to appropriately transport a sheet type medium through the first medium transport path and the second medium transport path and to appropriately transport a booklet type medium through the first medium transport path and the third medium transport path that is coupled to the first medium transport path while being gently inclined with respect to the first medium transport path. Moreover, it is not necessary to prepare a space for allowing the insertion or discharge of the medium at the back side of the apparatus because the third medium transport path is coupled to the first medium transport path while being inclined in the direction in which the second medium transport path is inclined. Therefore, it is possible to appropriately transport not only the sheet type medium but also the booklet type medium and read a side of the sheet type medium and a side of the booklet type medium and to suppress an increase in size of a space required for the installation of the apparatus.

According to the first aspect, the reading apparatus of a second aspect of the present disclosure further includes a switching section that switches between transport of the medium through the first medium transport path and the second medium transport path and transport of the medium through the first medium transport path and the third medium transport path.

According to the present aspect, the reading apparatus includes the switching section that switches between transport of the medium through the first medium transport path and the second medium transport path and transport of the medium through the first medium transport path and the third medium transport path. Therefore, it is possible to switch to an appropriate medium transport path by using the switching section depending on whether to read the sheet type medium or to read the booklet type medium.

According to the second aspect, in the reading apparatus according to a third aspect of the present disclosure, the switching section is a flap configured to rotate based on a rotation shaft, and the flap rotates to switch between a first isolation state in which the flap isolates the second medium transport path from the first medium transport path and an second isolation state in which the flap isolates the third medium transport path from the first medium transport path.

According to the present aspect, the flap configured to rotate based on the rotation shaft rotates to switch between isolation of the second medium transport path from the first medium transport path and isolation of the third medium transport path from the first medium transport path. Therefore, it is possible to switch to an appropriate medium transport path by using the flap that can rotate based on the rotation shaft, the flap being a simple component.

According to the third aspect, in the reading apparatus of a fourth aspect of the present disclosure, an end portion of the flap has at least one first rugged portion, and at least one second rugged portion engaged with the at least one first rugged portion is formed at a position that come into contact with the end portion in the first state.

According to the present aspect, the distal end portion of the flap has the rugged portion, and the rugged portions that are engaged with the rugged portion are formed at the positions that come into contact with the distal end portion at the isolation using the flap. Therefore, since the medium transport path is reliably isolated by the flap, it is possible to inhibit the medium from erroneously entering the isolated medium transport path.

According to any one of the first to fourth aspects, the reading apparatus of a fifth aspect of the present disclosure, the third medium transport path is arranged such that a leading portion of the medium transported from the first medium transport path toward the third medium transport path is supportable by the medium mounting section.

Further, according to any one of the first to fifth aspects, in the reading apparatus, the medium mounting section is configured to support a leading portion of the medium discharged from the third medium transport path.

According to the present aspect, the third medium transport path is arranged such that the leading portion of the medium transported toward a side opposite to a side on which the first medium transport path is present is supportable by the medium mounting section. Therefore, when the leading portion of the medium transported through the third medium transport path toward a side opposite to a side on which the first medium transport path is present protrudes from the third medium transport path, the leading portion is supported by the medium mounting section, so that it is possible to inhibit the medium from being erroneously escaping from the third medium transport path.

According to any one of the first to fifth aspects, the reading apparatus of a sixth aspect of the present disclosure further includes: a sensing section that senses the medium inserted into an first insertion port, the first insertion port being provided at the first medium transport path on a side opposite to a side on which the second medium transport path and the third medium transport path are coupled to the first medium transport path; and a drawing section that draws the medium from the first insertion port when the sensing section senses insertion of the medium into the first insertion port.

According to the present aspect, the reading apparatus further includes: the insertion port for the medium, the insertion port being provided at the first medium transport path on the side opposite to the side on which the second medium transport path and the third medium transport path are coupled to the first medium transport path; the sensing section that senses the medium inserted into the insertion port; and the drawing section that draws the medium from the insertion port when the sensing section senses insertion of the medium into the insertion port. Therefore, it is possible to feed the medium from the side opposite to the side on which the second medium transport path and the third medium transport path are coupled to the first medium transport path and to allow the medium to be simply fed in front of the apparatus.

Hereinafter, a reading apparatus 1 according to an embodiment of the present disclosure will be described with reference to the drawings. In an X-Y-Z coordinate system in each drawing, a Y-axis direction indicates a depth direction of the apparatus, an X-axis direction indicates a width direction of the apparatus, and a Z-axis direction indicates a height direction of the apparatus. Here, as illustrated in FIG. 1, the Y-axis direction corresponds to a direction along a first medium transport path R1 which is a medium transport path including a reading position 15 that faces a reading section 5. The X-axis direction corresponds to an axial direction of a rotation axis of various rollers such as a feeding roller 3, a first transport roller pair 4, and a second transport roller pair 6. The Z-axis direction corresponds to a direction in which the reading section 5 and a medium face each other at the reading position 15. Further, a +Y direction corresponds to a front direction, a −Y direction corresponds to a back direction, a +Z direction corresponds to a top direction, and a −Z direction corresponds to a bottom direction.

Schematic Configuration of Reading Apparatus

First, a schematic configuration of the reading apparatus 1 of the present embodiment will be described with reference to FIG. 1. The reading apparatus 1 of the present embodiment is a document scanner capable of reading both sides of a medium as an original while moving the medium with respect to the reading section 5. However, the reading apparatus 1 according to the present disclosure may be a document scanner capable of reading only one side of a medium.

The reading apparatus 1 of the present embodiment can read a side of a sheet type medium. The reading apparatus 1 includes a medium mounting section 2 on which a sheet type medium to be read can be mounted, the medium mounting section 2 being provided at a casing 9 on a −Y direction side and a +Z direction side (back side and top side) of the casing 9. The medium mounted on the medium mounting section 2 is passed toward a second medium transport path R2 as a medium transport path in a direction A1 through an opening H2 and is fed to a first medium transport path R1 by a feeding roller 3.

On the medium mounting section 2, a plurality of sheet type media can be mounted. Therefore, in order to inhibit a plurality of sheet type media from being transported in an overlapping state, a separation roller or the like may be provided in the second medium transport path R2, for example, at a position that faces the feeding roller 3.

The medium fed to the first medium transport path R1 is transported to the reading position 15 by the first transport roller pair 4. The first transport roller pair 4 includes a driving roller 4A that rotates by a driving force of a motor (not illustrated) and a driven roller 4B that is provided at a position that faces the driving roller 4A and is drivenly rotated by the rotation of the driving roller 4A. As illustrated in FIG. 1, when viewed in the X-axis direction, the first medium transport path R1 is in a horizontal direction (Y-axis direction), and the second medium transport path R2 is inclined with respect to the horizontal direction.

The reading section 5 including a first reading section 5A and a second reading section 5B is provided at the reading position 15. One side of the medium transported to the reading position 15 is read by the first reading section 5A of the reading section 5 and the other side thereof is read by the second reading section 5B of the reading section 5.

An opening H1 is provided at the casing 9 on a +Y direction side of the casing 9 and a front side end portion of the first medium transport path R1. The second transport roller pair 6 is provided between the reading section 5 and the opening H1. The second transport roller pair 6 includes a driving roller 6A that rotates by a driving force of the motor (not illustrated) and a driven roller 6B that is provided at a position that faces the driving roller 6A and is drivenly rotated by the rotation of the driving roller 6A. When the second transport roller pair 6 is driven, the medium whose sides are read by the reading section 5 can be discharged through the opening H1 as a discharge port.

In the reading apparatus 1 of the present embodiment, since the medium can be discharged through the opening H1, a medium receiver that receives the medium discharged through the opening H1 may be provided. However, the reading apparatus 1 of the present disclosure may be a configuration in which the medium receiver is not provided.

Further, the reading apparatus 1 of the present embodiment can also read a side of a booklet type medium such as a passport or a bankbook in addition to the sheet type medium. When the reading apparatus 1 reads the side of the booklet type medium, the medium may be transported in a state where the booklet type medium is closed, or in a state where a page to be read is open. Further, the booklet type medium may be transported as it is without being covered by a separate member, or may be transported while being put into a transparent holder, a transparent case, or the like. When reading the side of the booklet type medium, the reading apparatus 1 can perform two transport methods. In a first transport method, an opening H3 is used as an insertion port, the opening H3 being provided at the casing 9 on the –Y direction side and the +Z direction side of the casing 9 and being provided more adjacent to the +Y direction side than the opening H2 is, and the opening H1 is used as the discharge port. In a second transport method, the opening H1 is used as the insertion port and the opening H3 is used as the discharge port.

When the reading apparatus 1 performs the transport method in which the opening H3 is used as the insertion port and the opening H1 is used as the discharge port, the booklet type medium is passed toward a third medium transport path R3 as a medium transport path in a direction A2 through the opening H3, and is fed to the first medium transport path R1 by the first transport roller pair 4. The medium fed to the first medium transport path R1 is transported to the reading position 15 by the first transport roller pair 4. As illustrated in FIG. 1, when viewed in the X-axis direction, the third medium transport path R3 is inclined with respect to the horizontal direction. Angles at which the second medium transport path R2 and the third medium transport path R3 are inclined with respect to the first medium transport path R1, or the like will be described later.

One side of the medium transported to the reading position 15 is read by the first reading section 5A and the other side thereof is read by the second reading section 5B. When the second transport roller pair 6 is driven, the medium whose sides are read by the reading section 5 is discharged through the opening H1 as the discharge port.

Meanwhile, when the reading apparatus 1 performs the transport method in which the opening H1 is used as the insertion port and the opening H3 is used as the discharge port, a user inserts a leading end of the booklet type medium into the opening H1. As illustrated in FIG. 1, a sensing section S is provided in the vicinity of the opening H1 in the first medium transport path R1. When the sensing section S senses the medium, the second transport roller pair 6 is driven to draw the medium from the opening H1 in a direction A3 and the medium is transported to the reading position 15.

One side of the medium transported to the reading position 15 is read by the first reading section 5A and the other side thereof is read by the second reading section 5B. When the first transport roller pair 4 is driven, the medium whose sides are read by the reading section 5 is transported from the first medium transport path R1 to the third medium transport path R3. Note that a rotation direction of each roller of the first transport roller pair 4 and the second transport roller pair 6 when the reading apparatus 1 performs the transport method in which the opening H1 is used as the insertion port and the opening H3 is used as the discharge port is reverse to a rotation direction of each roller of the first transport roller pair 4 and the second transport roller pair 6 when the reading apparatus 1 performs the transport method in which the opening H3 is used as the insertion port and the opening H1 is used as the discharge port.

Here, as illustrated in FIG. 1, in the reading apparatus 1 of the present embodiment, a flap 7 is provided at a coupling portion 8 between the first medium transport path R1 and the third medium transport path R3. Note that a specific configuration of the flap 7 will be described later. The flap 7 serves to switch to a medium transport path to be used. FIG. 1 illustrates a state where the flap 7 isolates the second medium transport path R2. Further, the flap 7 does not allow the medium drawn from the opening H1 in the direction A3 to be transported toward the second medium transport path R2 through the first medium transport path R1 and allows the medium to be transported toward the third medium transport path R3. The medium transported toward the third medium transport path R3 is discharged through the opening H3 as the discharge port.

Angles of Second Medium Transport Path and Third Medium Transport Path with Respect to First Medium Transport Path Next, the angles at which the second medium transport path R2 and the third medium transport path R3 are inclined with respect to the first medium transport path R1, or the like will be described with reference to FIG. 1, FIG. 2 which is an enlarged view of the coupling portion 8, and FIG. 4 which is a schematic side sectional view of a reading apparatus 100 of a reference example. Note that the reading apparatus 100 illustrated in FIG. 4 is also configured to be able to read a side of the booklet type medium in addition to the sheet type medium, similarly to the reading apparatus 1 of the present embodiment.

As described above, the reading apparatus 1 of the present embodiment can also read a side of the booklet type medium, in addition to the sheet type medium. The sheet type medium is easily crumpled and is often transported in a greatly crumpled state. On the other hand, the booklet type medium is not easily crumpled and is rarely transported in a greatly crumpled state. Therefore, the reading apparatus 100 of the reference example illustrated in FIG. 4 includes a first medium transport path R1 and a second medium transport path R2 as medium transport paths for the sheet type medium, and the first medium transport path R1 and a third medium transport path R3' as medium transport paths for the booklet type medium.

Here, the reading apparatus 100 of the reference example illustrated in FIG. 4 will be described. Note that, since the first medium transport path R1 and the second medium transport path R2, as the medium transport paths for the sheet type medium in the reading apparatus 100, are similar to those of the reading apparatus 1 of the present embodiment, a description thereof will be omitted. The reading apparatus 100 includes the third medium transport path R3' that is coupled straight from the first medium transport path R1. The reading apparatus 100 can perform a transport method in which an opening H3' is used as the insertion port, the opening H3' being provided at an end portion of the third medium transport path R3' on a −Y direction side, and an opening H1 is used as the discharge port. Further, the reading apparatus 100 can perform a transport method in which the opening H1 is used as the insertion port and the opening H3' is used as the discharge port.

Since the reading apparatus 100 includes the third medium transport path R3' that is coupled straight from the first medium transport path R1, it is possible to transport the booklet type medium almost without crumpling the booklet type medium. However, the size of the reading apparatus 100 is large because there is a limitation in internal configuration of the apparatus, for example, it is necessary to prevent a contact between the medium being transported through the third medium transport path R3' and a feeding roller 3. As is clear from comparing FIGS. 1 and 4, the size of the reading apparatus 100 in the height direction (Z-axis direction) is larger than that of the reading apparatus 1 of the present embodiment.

Further, in the reading apparatus 100, when the opening H3' is used as the discharge port, the discharged medium protrudes toward the −Y direction side which is the back side, and thus there is a possibility that the medium collides with an object that is present in a space below a medium mounting section 2. In this case, it may be impossible to efficiently use a space on the back side. In other words, when the reading apparatus 100 is used, a large space is required for the installation of the apparatus.

Meanwhile, in the reading apparatus 1 of the present embodiment, as illustrated in FIG. 1, the third medium transport path R3 is inclined in the +Z direction which is a direction in which the second medium transport path R2 is inclined with respect to the first medium transport path R1, and the third medium transport path R3 is provided so as to be more adjacent to the +Y direction side than the second medium transport path R2 is. Therefore, there is less limitation in internal configuration of the apparatus. In addition, the reading apparatus 1 does not have a configuration in which the medium is discharged at the −Y direction side which is the back side. Therefore, even when an object is present in a space below the medium mounting section 2, there is no possibility that the medium collides with the object, and thus it is possible to efficiently use a space on the back side.

Figure 2:
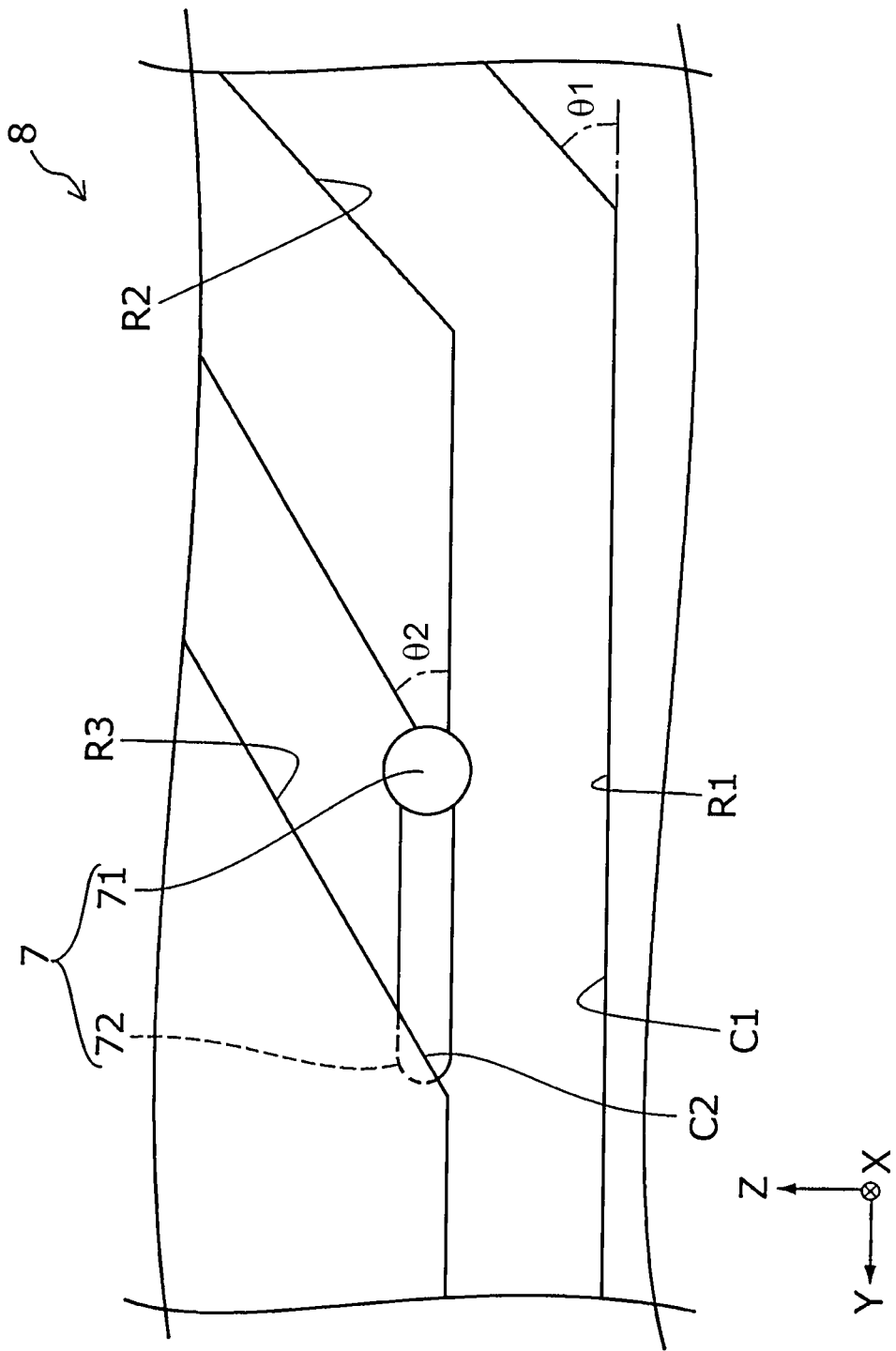
FIG. 2 is a schematic enlarged side sectional view illustrating a portion in the vicinity of a flap of the reading apparatus according to the embodiment of the present disclosure.

Here, as illustrated in FIG. 2, in the reading apparatus 1 of the present embodiment, a second angle θ2 at which the third medium transport path R3 is inclined with respect to the first medium transport path R1 is less than a first angle θ1 at which the second medium transport path R2 is inclined. That is, the medium transport path for the booklet type medium is configured to be able to transport the medium in a less crumpled state, as compared with the medium transport path for the sheet type medium. Therefore, in the reading apparatus 1 of the present embodiment, the first angle θ1 and the second angle θ2 allow appropriate transport of both the sheet type medium and the booklet type medium. Moreover, in the reading apparatus 1 of the present embodiment, the width (the length in the X-axis direction) or the height (the length in the z-axis direction) of each medium transport path, and the like allow appropriate transport of both the sheet type medium and the booklet type medium.

To sum up, the reading apparatus 1 of the present embodiment includes the reading section 5 that reads a side of a medium. Further, the reading apparatus 1 of the present embodiment includes the first medium transport path R1 including the reading position 15 that faces the reading section 5. Further, the reading apparatus 1 of the present embodiment includes the second medium transport path R2 that is coupled to the medium mounting section 2 and coupled to the first medium transport path R1 while being inclined at the first angle θ1 with respect to the first medium transport path R1. Moreover, the reading apparatus 1 of the present embodiment includes the third medium transport path R3 that is coupled to the first medium transport path R1 while being inclined at the second angle θ2 less than the first angle θ1 in the +Z direction which is the direction in which the second medium transport path R2 is inclined with respect to the first medium transport path R1.

Since the reading apparatus 1 of the present embodiment is configured as described above, it is possible to appropriately transport the sheet type medium through the first medium transport path R1 and the second medium transport path R2. Further, the reading apparatus 1 can also appropriately transport the booklet type medium through the first medium transport path R1 and the third medium transport path R3 that is coupled to the first medium transport path R1 while being gently inclined with respect to the first medium transport path R1. Moreover, the reading apparatus 1 of the present embodiment does not require a space for allowing the insertion or discharge of the medium at the back side of the apparatus, because the third medium transport path R3 is coupled to the first medium transport path R1 while being inclined in the direction in which the second medium transport path R2 is inclined. Therefore, the reading apparatus 1 of the present embodiment can appropriately transport not only the sheet type medium but also the booklet type medium and read a side of the sheet type medium and a side of the booklet type medium, and can suppress an increase in size of a space required for the installation of the apparatus.

Further, as described above, the reading apparatus 1 of the present embodiment includes the opening H1 as the insertion port for the medium, the opening H1 being provided at the first medium transport path R1 on the +Y direction side which is opposite to a side on which the second medium transport path R2 and the third medium transport path R3 are coupled to the first medium transport path R1. Further, the reading apparatus 1 includes the sensing section S that senses the medium inserted into the opening H1. Moreover, the reading apparatus 1 includes the second transport roller pair 6 as the drawing section that draws the medium from the opening H1 when the sensing section S senses the insertion of the medium into the opening H1. Therefore, the reading apparatus 1 of the present embodiment can feed the medium from a front side (+Y direction side), and the medium can be simply fed in front of the apparatus.

Here, in the reading apparatus 1 of the present embodiment, the second angle θ2 is less than the first angle θ1, and the opening H3 is arranged in the vicinity of the opening H2. Further, with such a configuration, in the reading apparatus 1 of the present embodiment, the third medium transport path R3 is arranged so that a leading portion of the medium transported from the first medium transport path R1 toward the third medium transport path R3 is supportable by the medium mounting section 2. Therefore, in the reading apparatus 1 of the present embodiment, when the leading portion of the medium transported on the third medium transport path R3 toward a side opposite to a side on which the first medium transport path R1 is present protrudes from the third medium transport path R3, the leading portion is supported by the medium mounting section 2, so that it is possible to inhibit the medium from being erroneously escaping from the third medium transport path R3.

Flap

Next, the configuration of the flap 7 and a portion of the first medium transport path R1 that comes into contact with a distal end portion 72 of the flap 7 will be described with reference to FIG. 1, FIG. 2, and FIG. 3 which is a schematic front view of the first medium transport path R1 when the coupling portion 8 is viewed from the +Y direction side.

As described above, the flap 7 serves as a switching section that switches between transport of the medium through the first medium transport path R1 and the second medium transport path R2 and transport of the medium through the first medium transport path R1 and the third medium transport path R3. Since the reading apparatus 1 of the present embodiment includes the flap 7 as the switching section, it is possible to switch to an appropriate medium transport path depending on whether to read the sheet type medium or to read the booklet type medium.

Here, FIGS. 1 and 3 illustrate a state where the flap 7 isolates the second medium transport path R2, and the first medium transport path R1 and the third medium transport path R3 are selected as usable medium transport paths. On the other hand, FIG. 2 illustrates a state where the flap 7 isolates the third medium transport path R3, and the first medium transport path R1 and the second medium transport path R2 are selected as usable medium transport paths. The flap 7 is a flap that can rotate based on a rotation shaft 71 as illustrated in FIGS. 2 and 3. The flap 7 rotates to switch between isolation of the second medium transport path R2 from the first medium transport path R1, and isolation of the third medium transport path R3 from the first medium transport path R1. The reading apparatus 1 of the present embodiment can switch to an appropriate medium transport path by using the flap 7 that can rotate based on the rotation shaft 71, the flap 7 being the switching section which is a simple component.

Further, as illustrated in FIG. 3, the distal end portion 72 of the flap 7 has a rugged portion. Further, rugged portions that are engaged with the rugged portion of the distal end portion 72 are formed at positions C1 and C2 that come into contact with the distal end portion 72 at the isolation using the flap 7. Therefore, in the reading apparatus 1 of the present embodiment, since the medium transport path is reliably isolated by the flap 7, it is possible to inhibit the medium from erroneously entering the isolated medium transport path.

Note that the state of the flap 7 of the present embodiment illustrated in FIG. 1 and the state of the flap 7 of the present embodiment illustrated in FIG. 2 are automatically set by a driving mechanism (not illustrated) depending on which one of the openings H1 to H3 is used as the insertion port and which one of the openings H1 to H3 is used as the discharge port. However, the flap 7 of the present embodiment is not limited to such a configuration, and a driving force source for rotating the flap 7 does not have to be included. For example, the flap 7 may rotate and be opened by being pressed by the transported medium to select a medium transport path to be used.

Further, the length of the flap 7 of the present embodiment in the X-axis direction corresponds to the entire width of the medium transport path. However, the flap 7 of the present embodiment is not limited to such a configuration. For example, the length of the flap 7 does not have to correspond to the entire width of the medium transport path, as long as the length of the flap 7 is equal to or larger than the width of a medium in use. Further, as illustrated in FIGS. 1 to 3, the flap 7 of the present embodiment includes the rotation shaft 71 provided at a wall portion on a +Z direction side of the first medium transport path R1. However, the flap 7 of the present embodiment is not limited to such a configuration. For example, the rotation shaft 71 may be provided at a wall portion on a −Z direction side of the first medium transport path R1.

It goes without saying that the present disclosure is not limited to the embodiment described above, that a variety of modifications can be made without departing from the scope of the present disclosure described in the claims, and that the modifications also fall within the scope of the present disclosure.

What is claimed is:

1. A reading apparatus comprising:
    a reader that reads a side of a medium;
    a first medium transport path that includes a position facing the reader;
    a second medium transport path coupled to a medium mounter and coupled to the first medium transport path, the second medium transport path being inclined at a first angle with respect to the first medium transport path; and
    a third medium transport path coupled to the first medium transport path, the third medium transport path being inclined at a second angle, which is less than the first angle, with respect to the first medium transport path, wherein:

when the medium is received from an opening of the first medium transport path, the medium is transported from the first medium transport path to the third medium transport path, when the medium is received from an opening of the second medium transport path, the medium is transported from the second medium transport path to the first medium transport path, a leading portion of the medium transported from the first medium transport path toward the third medium transport path is supported by the medium mounter, and the third medium transport path is disposed above the second medium transport path.

2. The reading apparatus according to claim 1, further comprising a switcher that switches between transport of the medium through the first medium transport path and the second medium transport path and transport of the medium through the first medium transport path and the third medium transport path.

3. The reading apparatus according to claim 2, wherein the switcher is a flap configured to rotate based on a rotation shaft, and the flap rotates to switch between a first isolation state in which the flap isolates the second medium transport path from the first medium transport path and a second isolation state in which the flap isolates the third medium transport path from the first medium transport path.

4. The reading apparatus according to claim 3, wherein an end portion of the flap has at least one first rugged portion, and at least one second rugged portion engaged with the at least one first rugged portion is formed at a position that come into contact with the end portion in the first isolation state.

5. The reading apparatus according to claim 1, wherein the medium mounter is configured to support a leading portion of the medium discharged from the third medium transport path.

6. The reading apparatus according to claim 1, further comprising:
a sensor that senses the medium inserted into a first insertion port, the first insertion port being provided at the first medium transport path on a side opposite to a side on which the second medium transport path and the third medium transport path are coupled to the first medium transport path; and
a drawer that draws the medium from the first insertion port when the sensor senses insertion of the medium into the first insertion port.

7. The reading apparatus according to claim 2, further comprising:
a sensor that senses the medium inserted into an first insertion port, the first insertion port being provided at the first medium transport path on a side opposite to a side on which the second medium transport path and the third medium transport path are coupled to the first medium transport path; and
a drawer that draws the medium from the first insertion port when the sensor senses insertion of the medium into the first insertion port.

8. The reading apparatus according to claim 3, further comprising:
a sensor that senses the medium inserted into an first insertion port, the first insertion port being provided at the first medium transport path on a side opposite to a side on which the second medium transport path and the third medium transport path are coupled to the first medium transport path; and
a drawer that draws the medium from the first insertion port when the sensor senses insertion of the medium into the first insertion port.

9. The reading apparatus according to claim 6, wherein, the second medium transport path includes a second insertion port that is provided at the second medium transport path on a side opposite to a side on which the second medium transport path is coupled to the first medium transport path, the third medium transport path includes a third insertion port that is provided at the third medium transport path on a side opposite to a side on which the third medium transport path is coupled to the first medium transport path, the first insertion port is provided in a front side of the reading apparatus, and the second insertion port and the third insertion port are provided in an upper side of the reading apparatus.

10. The reading apparatus according to claim 7, wherein, the second medium transport path includes a second insertion port that is provided at the second medium transport path on a side opposite to a side on which the second medium transport path is coupled to the first medium transport path, the third medium transport path includes a third insertion port that is provided at the third medium transport path on a side opposite to a side on which the third medium transport path is coupled to the first medium transport path, the first insertion port is provided in a front side of the reading apparatus, and the second insertion port and the third insertion port are provided in an upper side of the reading apparatus.

11. The reading apparatus according to claim 8, wherein, the second medium transport path includes a second insertion port that is provided at the second medium transport path on a side opposite to a side on which the second medium transport path is coupled to the first medium transport path, the third medium transport path includes a third insertion port that is provided at the third medium transport path on a side opposite to a side on which the third medium transport path is coupled to the first medium transport path, the first insertion port is provided in a front side of the reading apparatus, and the second insertion port and the third insertion port are provided in an upper side of the reading apparatus.

12. The reading apparatus according to claim 1, wherein, the first medium transport path includes a first insertion port that is provided at the first medium transport path on a side opposite to a side on which the second medium transport path and the third medium transport path are coupled to the first medium transport path; and the second medium transport path includes a second insertion port that is provided at the second medium transport path on a side opposite to a side on which the second medium transport path is coupled to the first medium transport path, the third medium transport path includes a third insertion port that is provided at the third medium transport path on a side opposite to a side on which the third medium transport path is coupled to the first medium transport path, the first insertion port is provided in a front side of the reading apparatus, and the second insertion port and the third insertion port are provided in an upper side of the reading apparatus.

\* \* \* \* \*